United States Patent [19]

Turunen et al.

[11] Patent Number: 4,486,585
[45] Date of Patent: Dec. 4, 1984

[54] PROCEDURE FOR PRODUCING SOLUBLE CELLULOSE DERIVATIVES

[75] Inventors: Olli Turunen; Leo Mandell; Vidar Eklund; Kurt Ekman; Jouko Huttunen, all of Porvoo, Finland

[73] Assignee: Neste Oy, Finland

[21] Appl. No.: 537,379

[22] PCT Filed: Dec. 30, 1982

[86] PCT No.: PCT/FI82/00069
§ 371 Date: Aug. 30, 1983
§ 102(e) Date: Aug. 30, 1983

[87] PCT Pub. No.: WO83/02278
PCT Pub. Date: Jul. 7, 1983

[30] Foreign Application Priority Data

Dec. 30, 1981 [FI] Finland ................................. 814208

[51] Int. Cl.$^3$ ............................................. C08B 15/06
[52] U.S. Cl. ..................................................... 536/30
[58] Field of Search ........................................ 536/30

[56] References Cited

U.S. PATENT DOCUMENTS

| | | | |
|---|---|---|---|
| 2,134,825 | 11/1938 | Hill et al. | 536/30 |
| 3,352,773 | 11/1967 | Schwartz et al. | 536/30 |
| 4,404,369 | 9/1983 | Huttunen et al. | 536/30 |

FOREIGN PATENT DOCUMENTS

| | | | |
|---|---|---|---|
| 57105 | 8/1982 | European Pat. Off. | 536/30 |
| 216475 | 11/1924 | United Kingdom | 536/30 |
| 516672 | 1/1940 | United Kingdom | 536/30 |

OTHER PUBLICATIONS

Chemical Abstracts, Ninth Collective Index, vols. 76–85, 1972–1976, pp. 10320cs and 10321cs, "Cellulose [9004-34-6], Reactions—Degrdn. of".

*Primary Examiner*—Ronald W. Griffin
*Attorney, Agent, or Firm*—Steinberg & Raskin

[57] ABSTRACT

The present invention concerns a procedure for producing cellulose carbamate from cellulose and urea. To avoid alkali treatment of the cellulose used as starting material with a view to decreasing the degree of polymerization of the cellulose, the cellulose in web form is exposed to a radiation dose of preferably 0.5 to 10 Mrad from a radiation source, whereafter the cellulose is reacted with urea at elevated temperature.

10 Claims, No Drawings

PROCEDURE FOR PRODUCING SOLUBLE CELLULOSE DERIVATIVES

The present invention concerns a procedure for producing soluble cellulose derivatives. In particular the invention relates to a procedure for producing cellulose compounds which can be dissolved in alkali and therefrom precipitated in the form of film or fibre.

When producing regenerated cellulose, most often the so-called viscose method is applied towards cellulose dissolving, in said method first being prepared alkali cellulose and this is reacted with carbon disulphide to obtain cellulose xanthogenate. The cellulose xanthogenate may be dissolved in a alkali solution and regenerated by precipitation in film or fibre form to become cellulose again. The carbon disulphide used in the method is an extremely toxic substance. Endeavours have been made to find a substituting chemical to replace it which would be economical enough in use and which would not cause similar environmental and health detriments as are caused by carbon disulphide. No commercial methods or processes to replace the viscose method are in use to date.

Finnish Pat. No. 61033 and our copending patent application Ser. No. 341,133, filed Jan. 20, 1982, now U.S. Pat. No. 4,404,369, disclose procedures for manufacturing alkali soluble cellulose carbamate from cellulose and urea. When urea is heated to the melting point or to a higher temperature, it begins to decompose, forming isocyanic acid and ammonia. Isocyanic acid in itself is not a particularly stable compound: it tends to become trimerized into isocyanuric acid. Further, isocyanic acid tends to react with urea, whereby biuret is formed. Isocyanic acid also reacts with cellulose, producing an alkali soluble cellulose compound, which is called cellulose carbamate. The reaction may be written as follows

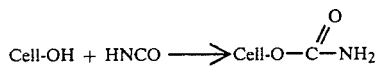

The compound thus produced, that is cellulose carbamate, may be dried after washing and stored even for prolonged periods or it may be directly dissolved in alkali solution. From this solution may be manufactured cellulose carbamate fibres by spinning, in like manner as in the viscose fibre manufacturing process. The keeping quality of cellulose carbamate and its transportability in dry state afford a very great advantage compared with the cellulose xanthogenate in the viscose method, which cannot be stored nor transported, not even in solution form.

The degree of polymerisation of the cellulose that is used as the starting material in the procedures described in Finnish Pat. No. 61033 and U.S. Pat. No. 4,404,369 has a great significance regarding the end product. The higher the degreee of polymerisation of the staring cellulose, the higher the viscosity of the alkaline solution of the end product, and correspondingly, the lower the cellulose carbamate content of the solution obtained in dissolving the end product. As regards the solubility of the end product, it is also essential that the degree of polymerisation of the cellulose starting material is as uniform as possible. A suitable DP of the cellulosic starting material is between 800 and 400.

For decreasing the polymerisation degree of cellulose, an alkali treatment has been applied in traditional methods. This involves treating the cellulose in sheet or fibre form with an 18% alkali solution. Through the effect of air or oxygen, depolymerisation of the cellulose is achieved. If the cellulose is in sheets, it is shredded at this phase in order to enhance the effect of air. If desired, the alkali treatment may be discontinued at the polymerisation degree desired by washing with water and drying. Cellulose which has been treated in this manner and dry-comminuted is suitable for use as starting material in manufacturing cellulose carbamate.

On the other hand, the alkali treatment mentioned is a process involving several steps and conducive to higher cost and it includes quite many drawbacks. In the method, it is necessary to add water and alkali to the cellulose. Before the next step, the substances mentioned have to be removed from the cellulose by the aid of a washing and drying process, which causes considerable extra costs.

The object of the present invention is to produce a procedure for manufacturing cellulose carbamate from cellulose and urea, in which the cellulose to be used as starting material need not be treated with alkali to reduce the degreee of polymerisation of the cellulose.

The procedure of the invention for producing cellulose carbamate from urea and cellulose is characterized in that on cellulose in web form is directed from a radiation source, a radiation dose of preferably between 0.5 and 10 Mrad, whereafter the cellulose is reacted with urea at elevated temperature.

Said irradiation causes in the fibres of the cellulose web a reduction of their degree of polymerisation in a most economical way. The irradiation is best effected by conducting the cellulose in the form of a web past the radiation source. When an efficient radiation source is used, depolymerisation takes place very rapidly, and the degree of polymerisation is easily adjustable by changing the power or the irradiation time. The irradiation may either be carried out at the cellulose mill at the cellulose drying phase or equally at the first phase of the cellulose carbamate process. Since the irradiation takes place in sheet form, it is possible to treat the cellulose at the initial phase of the carbamate process in the form of a continuous web, which simplifies the process. This is not, however, indispensable. What is essential is that when irradiation is used the expensive and multi-step alkali treatment is totally eliminated.

When speaking of irradiation, that part of the electromagnetic spectrum is usually referred to which has an energy level between 10 eV and 10 MeV and a wavelength correspondingly downward from the wavelength of ultraviolet light. In the process according to the invention, that part of the electromagnetic spectrum in particular is applied which is called the ionizing radiation range. This includes electron rays and gamma radiation. Electron rays are a particle radiation produced by charged electrons when they are accelerated in an electric field. Gamma radiation is electromagnetic radiation, or photons. As is well-known, ionizing radiation may initiate various chemical reactions such as polymerization, cross-linking, branching and decomposition.

In the procedure according to the invention, conventional apparatus may be utilized to produce gamma radiation or an accelerated electron beam. Conventional gamma radiators in general comprise radiation shielding, transportation apparatus for the material to be irradiated and the radiation source itself, in which capacity cobalt-60 is usually employed. To produce electron radiation, it is common to employ a tungsten filament cathode to generate electrons, which are accelerated in vacuum by the aid of an electric field to obtain desired energy level, which most often is between 0.5 MeV and 4 MeV. As regards the invention, it is not essential what kind of apparatus is used to produce the accelerated electron beam or the gamma radiation; for this reason, their design and properties are not gone into more closely here.

The cellulose web irradiated in the manner described in the foregoing is subsequently contacted with urea at elevated temperature to form cellulose carbamate. The urea may be added for instance by applying the method disclosed in Finnish patent No. 61033 and U.S. Pat. No. 4,404,369. As taught by the latter procedure, urea is dissolved in liquid ammonia, and the cellulose fibres are treated at a temperature lower or higher than the boiling point of ammonia. In the latter case, the treatment is carried out in a pressure vessel. In the method of the present invention, it is possible to apply the same procedure with the only difference that the cellulose fibres are treated in ammonia solution in web form. If need be, the cellulose web is conducted through an ammonia both supported by endless wires.

The amount of urea in the ammonia solution may be selected within a fairly wide range, depending on the other process variables. Normally, the sufficient quantity of urea is between 15 and 120% by weight, calculated on the cellulose weight. The quantity of urea to be selected in each case is dependent among other things on the reaction temperature used and reaction time. The requisite impregnation period ranges from about five seconds to several hours.

After the ammonia/urea treatment, the ammonia is removed from the cellulose web in some suitable manner. In this connection, the urea remains in the cellulose, being homogeneously distributed. The ammonia is preferably recovered and reused. Towards evaporation, it is possible to use for instance vacuum treatment and/or heating.

The actual reaction between cellulose and urea is carried out at elevated temperature after removing the ammonia. The reaction time needed depends, among other things, on the quantity of urea, on the circumstances during the impregnation and on the method of heating. As a rule, a temperature between 110° C. and 200° C. is needed. The requisite reaction time usually varies from one hour to a few hours. The heating and reacting of cellulose and urea are preferably carried out at subatmospheric pressure, whereby the ammonia (g) that is formed in the reaction is rapidly voided from the reaction volume.

The heat treatment may take place either in a volume like a heating oven or by conducting the cellulose web treated with urea through a liquid bath which is at the requisite temperature. If needed, the web is conducted through the heat treatment, supported by wires or equivalent. If liquid is utilized, a liquid is selected which will not dissolve urea. The lower the temperature at which the liquid boils, the greater the ease with which it can be removed after the reaction, e.g. by evaporating. Suitable liquids are, for instance, aromatic or aliphatic hydrocarbons with a relatively low boiling point.

On completed reaction, the end product is washed once or several times e.g. with methanol and dried. Preferably, however, the end product is washed with liquid ammonia. Hereby is gained the advantage that the biurets which may have formed as a by-product in the reaction be converted into urea and reused. The dried end product, that is cellulose carbamate, is stable in the dry state, and it can be stored or transported as it is. This is a major advantage compared with the viscose process, where the cellulose xanthate produced with the aid of carbon disulphide is not a stable compound which could be stored or transported for use elsewhere.

The cellulose carbamate manufactured by the procedure of the invention may at any time whatsoever be dissolved in an aqueous solution of sodium hydroxide, of which it is possible to produce fibre and film by precipitating it in proper conditions.

The cellulose starting material used in the procedure of the invention may be wood cellulose or cotton or it may consist of other natural or artificial fibres containing cellulose. The cellulose may enter the process in its inherent state, or in bleached condition, as cellulose hydrate, as alkali cellulose or in a form treated in another way, for instance with acids. Using conventional methods, a web is produced from the starting material, having a thickness which may vary from 0.2 to 2 mm, which corresponds to density per unit area of 200 to 2000 grams per square meter. If the starting material is cotton, it may well be e.g. in the form of fabric.

The invention is described in closer detail in the examples following. When a cellulose solution intended to be spun into fibres is concerned, one of its most important characteristics is filtrability. Filtrability is described in the examples by the so-called clogging number defined in the article: H. Sihtola, Paperi ja Puu 44 (1962), No. 5, p. 295–300. In the method a miniature filter is used, having 3.8 cm² effective area, the filter material being Macheey-Nagel MN 616 paper. The filtrability is calculated by the formula:

$$KW_{20,60} = \frac{1}{2} \cdot \left( \frac{60}{P_{60}} - \frac{20}{P_{20}} \right),$$

where
$P_{20}$ = cellulose quantity (in g) passing through the filter in 20 min.
$P_{60}$ = cellulose quantity (in g) passing through the filter in 60 min.
$KW_{20,60}$ = clogging number.

EXAMPLE 1

80 grams of bleached sulphite cellulose with DP 800 were irradiated in the form of a web, of thickness 1.1 mm. An electron accelerator with 400 KeV voltage and 13.7 mA current intensity was used for irradiation. The irradiation dose was 1–1.2 Mrad. The DP of the cellulose decreased under irradiation to be 360. The cellulose was beaten to powder in a hammer mill and impregnated at −35° to −40° C. with 600 ml of liquid ammonia, in which had been dissolved 40 g of urea so that the weight proportion of cellulose and urea becamse 1:05 and 1:1. The impregnation time was 3 hours. Thereupon the ammonia was allowed to evaporate at normal pressure.

In order to execute the reaction between cellulose and urea, the cellulose samples impregnated with urea were placed in a heating chamber, and treatment periods of various lengths and varying temperatures were used. Upon completed reaction, the cellulose carbamate products were washed once with methanol, twice with water and one more time with methanol. The degree of deploymerisation (DP) and nitrogen content of the cellulose carbamate samples obtained were measured. For estimating solubility and spinability, the samples were dissolved at $-5°$ C. in sodium hydroxide, of 10% concentration. Viscosity, carbamate content and clogging number of the solutions obtained were measured. The results are stated in Table I. The abbreviation AGU stands for anhydroglucose unit.

TABLE I

| REACTION | | | PRODUCT | | DISSOLVING TEST | | |
|---|---|---|---|---|---|---|---|
| Time (h) | Temperature (°C.) | AGU: UREA | DP | Nitrogen content (%) | Viscosity (s) | CCA content (%) | Clogging number K |
| 5,5 | 140 | 1:0,5 | 230 | 1,7 | 69 | 8,0 | 4100 |
| 6,0 | 140 | 1:0,5 | 245 | 1,4 | 116 | 8,2 | 4400 |
| 5,0 | 145 | 1:0,5 | 205 | 1,8 | 56 | 8,0 | 2160 |
| 5,5 | 145 | 1:0,5 | 245 | 1,5 | 113 | 8,0 | 1900 |
| 2,5 | 155 | 1:1 | 230 | 1,8 | 89 | 8,0 | 635 |
| 2,5 | 155 | 1:1 | 235 | 2,1 | 86 | 8,0 | 690 |
| 3,0 | 155 | 1:1 | 250 | 2,3 | 108 | 8,0 | 800 |

EXAMPLE 2

A cellulose web comprising bleached sulphite cellulose (DP=800), of thickness 1.1 mm was treated in an electron accelerator (400 kV, 13.7 mA), whereby the cellulose fibres received an irradiation dose of 1 Mrad. The DP of the cellulose was 350 after this treatment. Thereafter the web was immersed in liquid ammonia, in which 10% by weight urea had been dissolved whereby the molar proportion of urea and cellulose was 1:1.3 and temperature $-40°$ C. The sheet impregnating time was 3 hrs. Thereafter, the sheets were transferred into room temperature and the ammonia was allowed to evaporate.

The reaction between cellulose and urea was enacted by immersing the sheets in petroleum ether bath of 140° C. The reaction periods were 4, 5 and 6 hours. The carbamate products obtained after reaction were washed once with methanol, twice with water and one more time with methanol. From the cellulose carbamate samples obtained, DP and nitrogen content were measured. For assessing solubility and spinability, the sheets were dissolved in 10% sodium hydroxide. From the solutions thus obtained, viscosity, carbamate content and clogging number were determined. The results are presented in Table II.

TABLE II

| REACTION | | | PRODUCT | | DISSOLVING TEST | | |
|---|---|---|---|---|---|---|---|
| Time (h) | Temperature (°C.) | AGU: UREA | DP | Nitrogen content (%) | Viscosity (s) | CCA content (%) | Clogging number K |
| 4,0 | 140 | 1:1,3 | 250 | 1,1 | 91 | 7,7 | 5400 |
| 5,0 | 140 | 1:1,3 | 250 | 1,2 | 80 | 7,7 | 2900 |
| 6,0 | 140 | 1:1,3 | 250 | 1,1 | 119 | 7,7 | 20000 |

EXAMPLE 3

Cellulose web was irradiated as in Example 1, whereafter the cellulose was beaten in a ball mill into fine powder. Also the impregnation with a mixture of urea and ammonia was carried out as in Example 1, but using 1:0.75 cellulose/urea molar proportion.

The reaction between cellulose and urea was executed by immersing the cellulose samples in a petroleum ether bath, the temperature of which was 140° C. The dissolving test was carried out as in Example 1.

The results are stated in Table III.

TABLE III

| REACTION | | | PRODUCT | | DISSOLVING TEST | | |
|---|---|---|---|---|---|---|---|
| Time (h) | Temperature (°C.) | AGU: UREA | DP | Nitrogen content (%) | Viscosity (s) | CCA content (%) | Clogging number K |
| 4,0 | 140 | 1:0,75 | 225 | 1,8 | 76 | 8,0 | 820 |
| 5,5 | 140 | 1:0,75 | 235 | 2,3 | 68 | 7,9 | 700 |
| 6,5 | 140 | 1:0,75 | 240 | 2,3 | 81 | 7,9 | 700 |

EXAMPLE 4

40 grams of bleached sulphite cellulose in sheet form was irradiated with gamma radiator in the manner that the irradiation dose absorbed by the cellulose fibres was 2 Mrad. The DP of the cellulose was thereafter 280. The sheet was ground into powder in a ball mill and the powder was placed for 6 hrs in 450 ml of liquid ammonia ($-40°$ C.) in which 15 g of urea had been dissolved. The ammonia was thereafter allowed to evaporate at room temperature and under normal pressure.

The reaction between cellulose and urea was carried out in a heating chamber at 145° C. Upon completed reaction, the cellulose carbamate was washed with methanol, twice with water, and once again with methanol. The dissolving test was carried out as in Example 1. The results are stated in Table IV.

TABLE IV

| REACTION | | PRODUCT | | DISSOLVING TEST | | |
|---|---|---|---|---|---|---|
| Time (h) | Temperature (°C.) | DP | Nitrogen content (%) | Viscosity (s) | CCA content (%) | Clogging number K |
| 3 | 145 | 245 | 2,2 | 106 | 8,0 | 1170 |
| 3,5 | 145 | 250 | 2,4 | 116 | 8,0 | 950 |
| 4 | 145 | 200 | 2,0 | 78 | 9,0 | 1100 |
| 4,5 | 145 | 240 | 2,4 | 106 | 8,0 | 3700 |
| 5 | 145 | 250 | 2,6 | 102 | 8,0 | 4400 |
| 3,5 | 145 | 245 | 1,6 | 100 | 8,0 | 880 |
| 4,0 | 145 | 235 | 1,8 | 95 | 8,0 | 820 |
| 4,5 | 145 | 245 | 2,1 | 92 | 8,0 | 4150 |
| 5,0 | 145 | 240 | 2,3 | 104 | 8,0 | 1100 |
| 5,5 | 145 | 245 | 2,3 | 98 | 8,0 | 890 |

EXAMPLE 5

Cellulose sheets treated by gamma irradiation as in Example 4, having 1.1 mm thickness, were impregnated with liquid ammonia at $-40°$ C. in which was dissolved 10% urea.

Thereafter, the ammonia was evaporated at room temperature and in normal pressure. The test sheets were then immersed in petrol ether of 180° C. for 10–6 min. Upon completed reaction, the sheets were washed twice with 600 ml methanol and water and finally once more with methanol. The clogging number was determined in 10% NaOH at $-5°$ C. The results are stated in Table V.

TABLE V

| REACTION | | PRODUCT | | DISSOLVING TEST | | |
|---|---|---|---|---|---|---|
| Time (h) | Temperature (°C.) | Urea, % of cellulose | DP | Nitrogen content (%) | Viscosity (s) | CCA content (%) | Clogging number K |

| Time (h) | Temperature (°C.) | Urea, % of cellulose | DP | Nitrogen content (%) | Viscosity (s) | CCA content (%) | Clogging number K |
|---|---|---|---|---|---|---|---|
| 15 | 180 | 48 | 293 | 2,0 | 83 | 7,0 | 1400 |
| 10 | 180 | 48 | 286 | 1,6 | 102 | 7,0 | 1800 |
| 15 | 180 | 28 | 341 | 1,7 | 66 | 6,0 | 700 |
| 60 | 180 | 28 | 372 | 1,8 | 77 | 6,0 | 600 |

EXAMPLE 6

The test as in Example 5 was repeated, xylene being however used instead of petrol ether. The results are stated in Table VI.

TABLE VI

| REACTION | | | PRODUCT | | DISSOLVING TEST | | |
|---|---|---|---|---|---|---|---|
| Time (h) | Temperature (°C.) | Urea, % of cellulose | DP | Nitrogen content (%) | Viscosity (s) | CCA content (%) | Clogging number K |
| 4,0 | 140 | 25 | 250 | 1,1 | 91 | 7,7 | 5400 |
| 5,0 | 140 | 48 | 250 | 1,2 | 80 | 7,7 | 2900 |

EXAMPLE 7

As in Example 1, bleached sulphite cellulose was exposed to radiation, whereafter the DP of the cellulose was 434. The cellulose sheets were then impregnated with aqueous urea solution, which contained potassium cyanate. After the impregnation, the sheets were dried, and the urea content of the cellulose was then 50% and the KOCN-content was 1%. Thereafter, the sheets were placed for 3 hours in a heating chamber with 140° C. temperature. In the first two cases, nitrogen gas was drawn through the oven, and air in the third. The characteristics of the product obtained are stated in Table VII.

TABLE VII

| DP | Nitrogen content % | Viscosity s | Clogging number |
|---|---|---|---|
| 260 | 1,3 | 42,5 | 1970 |
| 372 | 1,2 | 58,7 | 1690 |
| 390 | 0,8 | 47,2 | 4240 |

The clogging number was determined from a solution which contained 10% NaOH and 2% ZnO.

EXAMPLE 8

As in Example 1, cellulose with DP approximately 800 was exposed to radiation. The DP of the cellulose decreased to the value 520. Thereafter, the cellulose was beaten in the ball mill into powder which was suspended into xylene. The xylene was transferred into a reactor to be at 140° C., and urea at 38% of the weight of the cellulose was added. The cellulose carbamate product obtained was separated from the xylene after three hours and washed with methanol and water. The product had DP 400, viscosity 50.2 s, nitrogen content 1.3% and the clogging number 1310. The clogging number was obtained from a solution which contained 10% NaOH and 2% ZnO.

EXAMPLE 9

The cellulose sheets (5×5 dm$^2$, DP=186) treated with 40 g gamma radiation (8 Mrad) were dried at 105° C., impregnated in liquid ammonia (3 h) with 10% urea, the ammonia was allowed to evaporate at room temperature in normal pressure. The sheets were thereafter kept at 105° C. for 1 hour, whereafter the sheets were weighed (48 g, urea content 20% of cellulose). Solvent petroleum was heated at 190° C. on an oil bath. The cellulose sheets treated with urea were immersed in the solvent petroleum for 10 minutes. The temperature of the petroleum decreased first to 175° C. but rose to 179° C. in the course of the reaction. The sheets were transferred into cold solvent petroleum and washed twice with 1 liter of methanol, three times with 1 liter of water (60°0 C.), and once again with methanol.

The DP of the cellulose carbamate thus obtained was 146, its nitrogen content 1.4% and the clogging number 2346, measured at −5° C. in 10% NaOH solution (11.5% carbamate).

We claim:

1. Method of producing cellulose carbamate from cellulose and urea, which comprises exposing cellulose in web form to a radiation dose of 0.5–10 Mrad, thereby causing deploymerization of said cellulose, and reacting the thus depolymerised cellulose with urea at elevated temperature to thereby form cellulose carbamate.

2. Method according to claim 1, wherein after irradiation the cellulose is treated in web form with liquid ammonia in which urea has been dissolved, the ammonia is evaporated, and the resulting cellulose is heated to react it with the urea to form cellulose carbamate.

3. Method according to claim 1, wherein after irradiation the cellulose is treated with liquid ammonia in which urea has been dissolved, the ammonia is evaporated, and the resulting cellulose is heated in a liquid fluid in which urea is substantially insoluble.

4. Method according to claim 3, wherein a hydrocarbon or mixture of hydrocarbons is used as said liquid fluid.

5. Method according to claim 2, 3 or 4, wherein the treatment of cellulose with ammonia solution of urea takes place at a temperature below −33° C. or in a pressure vessel at a temperature higher than the boiling point of ammonia.

6. Method according to claim 5, wherein the reaction of cellulose and urea is carried out under reduced pressure.

7. Method according to claim 6, wherein after the reaction of cellulose and urea, the reaction product is washed with liquid ammonia.

8. Method according to claim 7, wherein the radiation used is within the range of ionizing radiation of the electromagnetic spectrum.

9. Method according to claim 8, wherein electron or gamma radiation is used to effect radiation.

10. Method according to claim 9, wherein the cellulose is in web form during all treatment steps.

* * * * *